United States Patent
Krasznai et al.

[19]

[11] Patent Number: 5,889,259
[45] Date of Patent: Mar. 30, 1999

[54] TOASTER OVEN CONTROL ASSEMBLY

[75] Inventors: Charles Z Krasznai, Fairfield; Paul F Garneau, East Haven; James F. Sciarra, North Haven, all of Conn.; Bernard L. Bensussen, Morrisville, N.C.

[73] Assignee: HP Intellectual Corp., Wilmington, Del.

[21] Appl. No.: 862,079

[22] Filed: May 22, 1997

[51] Int. Cl.⁶ ............... A21B 1/00; A23L 27/00; H01H 9/28; H01H 3/16
[52] U.S. Cl. ............ 219/414; 219/413; 99/331; 99/332; 200/43.16; 200/61.7
[58] Field of Search .................. 219/414, 413, 219/507, 492; 99/331, 332, 333; 200/43.16, 43.18, 43.19, 43.21, 61.7, 61.73

[56] References Cited

U.S. PATENT DOCUMENTS

| | | | |
|---|---|---|---|
| 3,585,360 | 6/1971 | Young et al. | 219/405 |
| 3,601,740 | 8/1971 | Filderbrant | 337/311 |
| 3,956,978 | 5/1976 | Borley | 99/329 R |
| 4,065,658 | 12/1977 | Keim | 219/386 |
| 4,166,268 | 8/1979 | Beck | 337/309 |
| 4,178,498 | 12/1979 | Snyder | 219/413 |
| 4,188,867 | 2/1980 | DeRemer | 99/385 |
| 4,189,632 | 2/1980 | Swanson et al. | 219/413 |
| 4,209,999 | 7/1980 | Falk et al. | 62/344 |
| 4,259,655 | 3/1981 | Balchunas | 337/361 |
| 4,277,659 | 7/1981 | DeRemer | 200/61.62 |
| 4,302,660 | 11/1981 | Swanson et al. | 219/391 |
| 4,340,806 | 7/1982 | Bergquist | 219/413 |
| 4,382,175 | 5/1983 | Huggler | 219/413 |
| 4,395,621 | 7/1983 | Parker | 219/492 |
| 4,413,173 | 11/1983 | Grove et al. | 219/412 |
| 4,420,072 | 12/1983 | Treffinger et al. | 192/139 |
| 4,427,876 | 1/1984 | Bonacorsi | 219/413 |
| 4,431,907 | 2/1984 | Barnett | 219/449 |
| 4,565,989 | 1/1986 | Lotter et al. | 337/311 |
| 4,734,562 | 3/1988 | Amano et al. | 219/413 |
| 4,746,785 | 5/1988 | De Longhi | 219/386 |
| 4,798,938 | 1/1989 | Husslein et al. | 219/395 |
| 4,894,518 | 1/1990 | Ishikawa et al. | 219/413 |
| 5,311,165 | 5/1994 | Kadlubowski | 337/323 |
| 5,378,874 | 1/1995 | Holling et al. | 219/506 |
| 5,402,708 | 4/1995 | Krasznai et al. | 99/328 |

*Primary Examiner*—Teresa Walberg
*Assistant Examiner*—Daniel L. Robinson
*Attorney, Agent, or Firm*—Barry E. Deutsch

[57] ABSTRACT

A toaster oven with a modular control assembly. The assembly has a frame, an electrical switch assembly, a solenoid, and two levers. The electrical switch assembly is connected to the frame and has multiple sets of electrical switch contact blades. The two levers are directly pivotably connected to the frame. A first lever is connected to the solenoid to be moved by the solenoid. The second lever is adapted to move one of the sets of contact blades to a closed position. The two levers have portions adapted to engage and lock against each other. The toaster oven has a rotatable control shaft with two fins extending from a main section of the shaft in general offset radial directions. The control shaft is supported on the electrical switch assembly and is connected to a thermostat. The thermostat has a cam surface and two raised areas on opposite ends of the cam surface.

6 Claims, 9 Drawing Sheets

TOASTER OVEN CONTROL ASSEMBLY

BACKGROUND OF THE INVENTION

1. Field of the Invention

The present invention relates to electrical appliances and, more particularly, to a control assembly for an electrical appliance.

2. Prior Art

U.S. Pat. No. 5,402,708 discloses a toaster with a control for varying the duration of the toast cycle. Electric toaster ovens are well known in the art as seen in U.S. Pat. Nos. 4,413,173 and 4,189,632.

SUMMARY OF THE INVENTION

In accordance with one embodiment of the present invention a toaster oven modular control assembly is provided comprising a frame, an electrical switch assembly, a solenoid, and two levers. The electrical switch assembly is connected to the frame. The switch assembly has multiple sets of electrical switch contact blades. The solenoid is connected to the frame. The two levers are directly pivotably connected to the frame. A first one of the levers is connected to the solenoid to be moved by the solenoid. A second one of the levers is adapted to move one of the sets of contact blades to a closed position. The two levers have portions adapted to engage and latch against each other.

In accordance with another embodiment of the invention, an electrical appliance is provided having a rotatable control shaft connecting a user actuated control knob to a thermostat. The improvement comprises the control shaft having two fins extending from a main section of the shaft in general offset radial directions.

In accordance with another embodiment of the present invention, an electrical appliance is provided having a heating element and a thermostat connected to the heating element. The thermostat has a cam surface. A portion of the shaft of the thermostat is biased against the cam surface. A user actuated control is connected to the thermostat shaft. The improvement comprises the cam surface having two raised sections at opposite ends of the cam surface.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
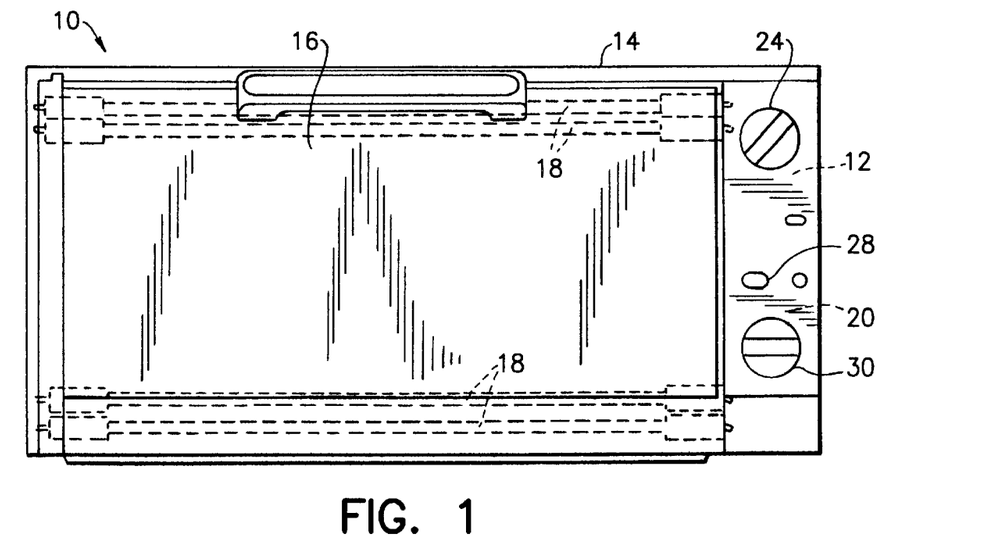
FIG. 1 is a front elevational view of a toaster oven incorporating features of the present invention.

Referring to FIG. 1, there is shown a front elevational view of a toaster oven 10 incorporating features of the present invention. Although the present invention will be described with reference to the single embodiment shown in the drawings, it should be understood that the present invention can be embodied in many alternate forms of embodiments. In addition, any suitable size, shape or type of elements or materials could be used.

Figure 2:
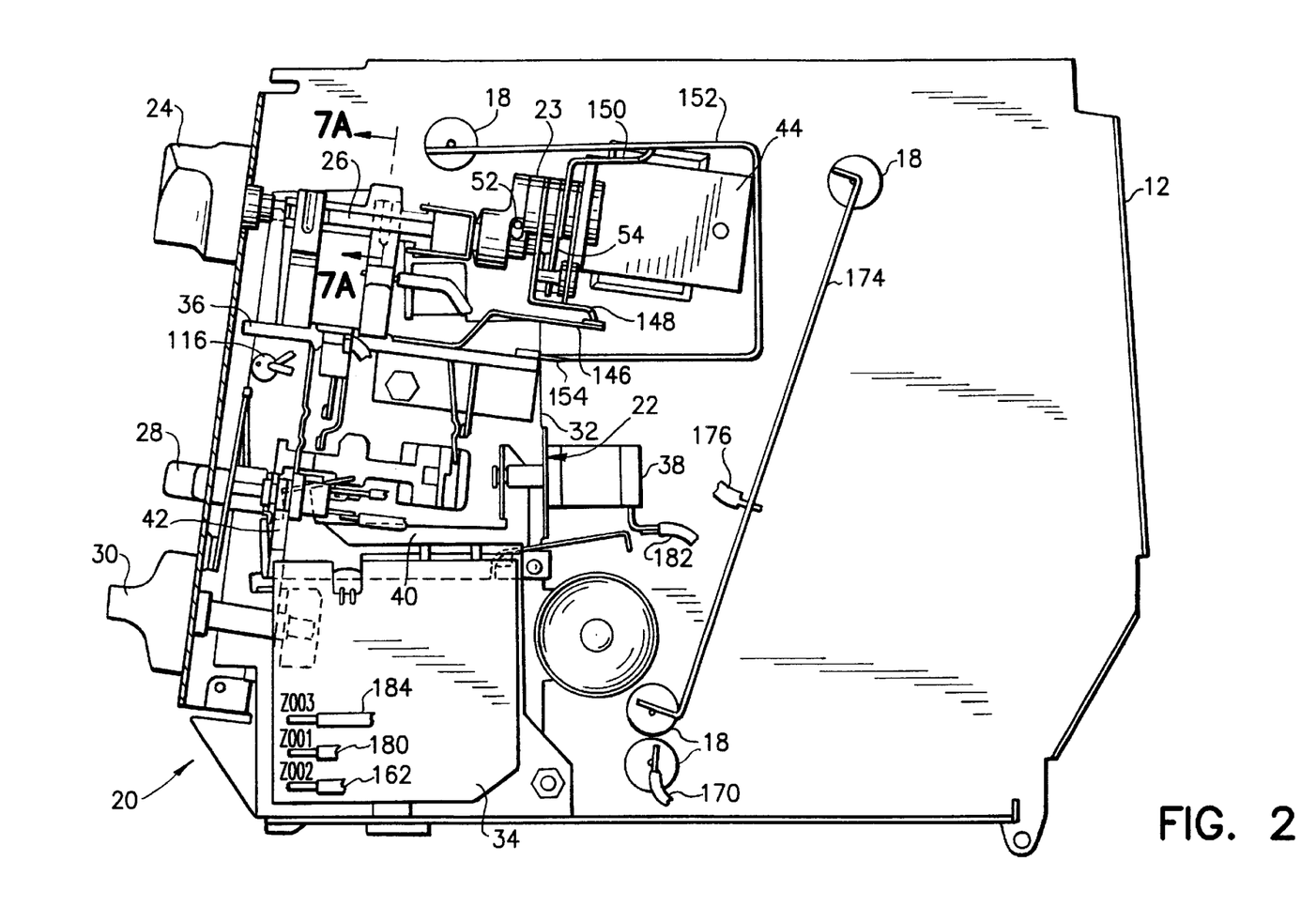
FIG. 2 is a side elevational view of the toaster oven shown in FIG. 1 with a side housing cover removed.

The toaster oven 10 generally comprises a frame 12, a housing 14, a movable door 16, heating elements 18, and a control 20. The control 20 is mounted to the frame 12 at the right side of the oven 10. Referring also to FIG. 2, the control 20 includes a modular control assembly 22, a thermostat 23 a bake/broil rotatable knob 24, a bake/broil control shaft 26, a toast push button 28, and a rotatable toast knob 30. The control assembly 22 has a frame 32, a printed circuit board 34, an electrical switch assembly 36, a solenoid 38, and levers 40, 42.

Figure 3A:
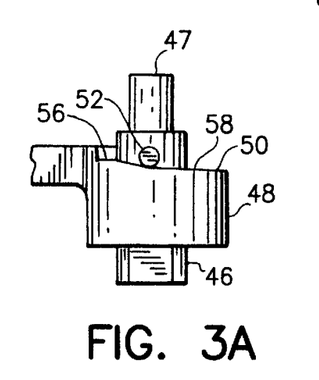
FIG. 3A is a partial view of the top of the thermostat shown in FIG. 2.
Figure 3B:
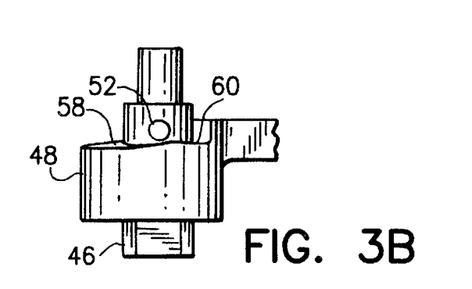
FIG. 3B is a partial view of the opposite side of the thermostat top shown in FIG. 3A with a shaft of the thermostat at a different position.
Figure 3C:
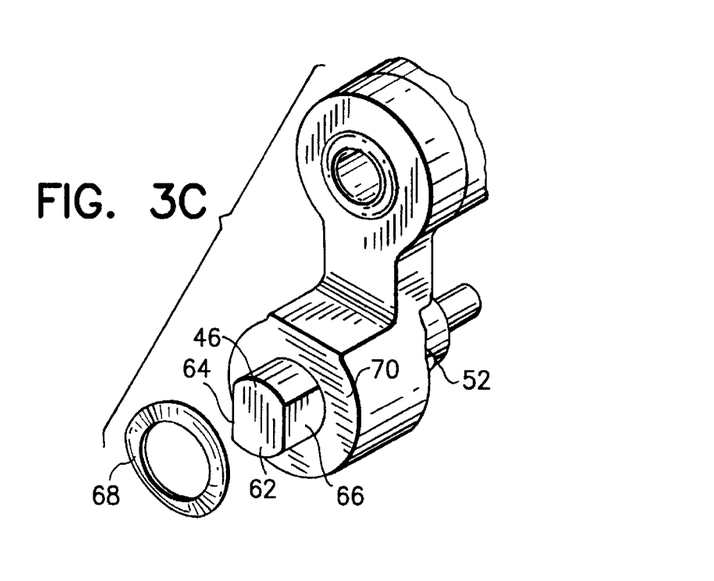
FIG. 3C is a partial perspective view of the thermostat top shown in FIG. 3A with its wavy spring disk.

The frame 32 is preferably a one-piece member made of sheet metal that has been cut and formed. The thermostat 23 is mounted to the frame 12 of the toast oven 10 by a mounting and heat transfer flange 44. The flange 44 is mounted to a wall of the frame adjacent the oven area. A hole in the frame wall allows heat in the oven area direct access to the flange 44. The thermostat 23 is similar to the thermostat described in U.S. Pat. No. 4,259,655 which is hereby incorporated by reference in its entirety. However, the thermostat 23 has a unique cam surface and a unique shaft top section. Referring also to FIG. 3A, the thermostat 23 has a shaft 46 that rotatably extends through a hole in the frame 48 of the thermostat. The frame 48 has a cam surface 50. The shaft 46 has a cam pin 52. The cam pin 52 rides along the cam surface 50 as the shaft 46 is axially rotated. The cam pin 52 is biased against the cam surface 50 because the bottom 47 of the shaft 46 is biased by the spring contact leaf 54 (see FIG. 2). The cam surface 50 has a first raised section 56, a sloped surface 58, and a second raised surface 60 (see FIG. 3B). When the cam pin 52 is on the first raised surface 56, it longitudinally locates the shaft 46 at a position to keep the contact areas of the two spring contact leaves of the thermostat separated. Therefore, the thermostat is OFF and no electricity flows through the thermostat. When the shaft 46 is axially rotated to move the cam pin 52 onto the sloped surface 58, electricity can flow through the thermostat. As known in the art, the flow of electricity through the thermostat can be interrupted by the thermostat based upon sensed temperature. However if the shaft 46 is axially rotated to the opposite far end of the sloped surface 58, as shown in FIG. 3B, it can be moved onto the second raised surface 60 at the end of the rotational movement of the shaft. The relative height of the second raised surface 60 is selected to locate the longitudinal position of the shaft 46 at a predetermined thermostat temperature setting for broiling such as 350° F. However, any suitable predetermined temperature setting could be provided. When the cam pin 52 is on the sloped surface 58, the bake temperature can be varied by the user. However, when the cam pin is on the second raised surface 60, the broil temperature is automatically set. Referring also to FIG. 3C, the top section 62 of the shaft 46 has two flat side sections 64, 66. The first flat side section 64 is larger than the second flat side section 66. A wavy spring disk 68 is mounted around the top section 62 against the surface 70 of the thermostat 23.

Figure 4:
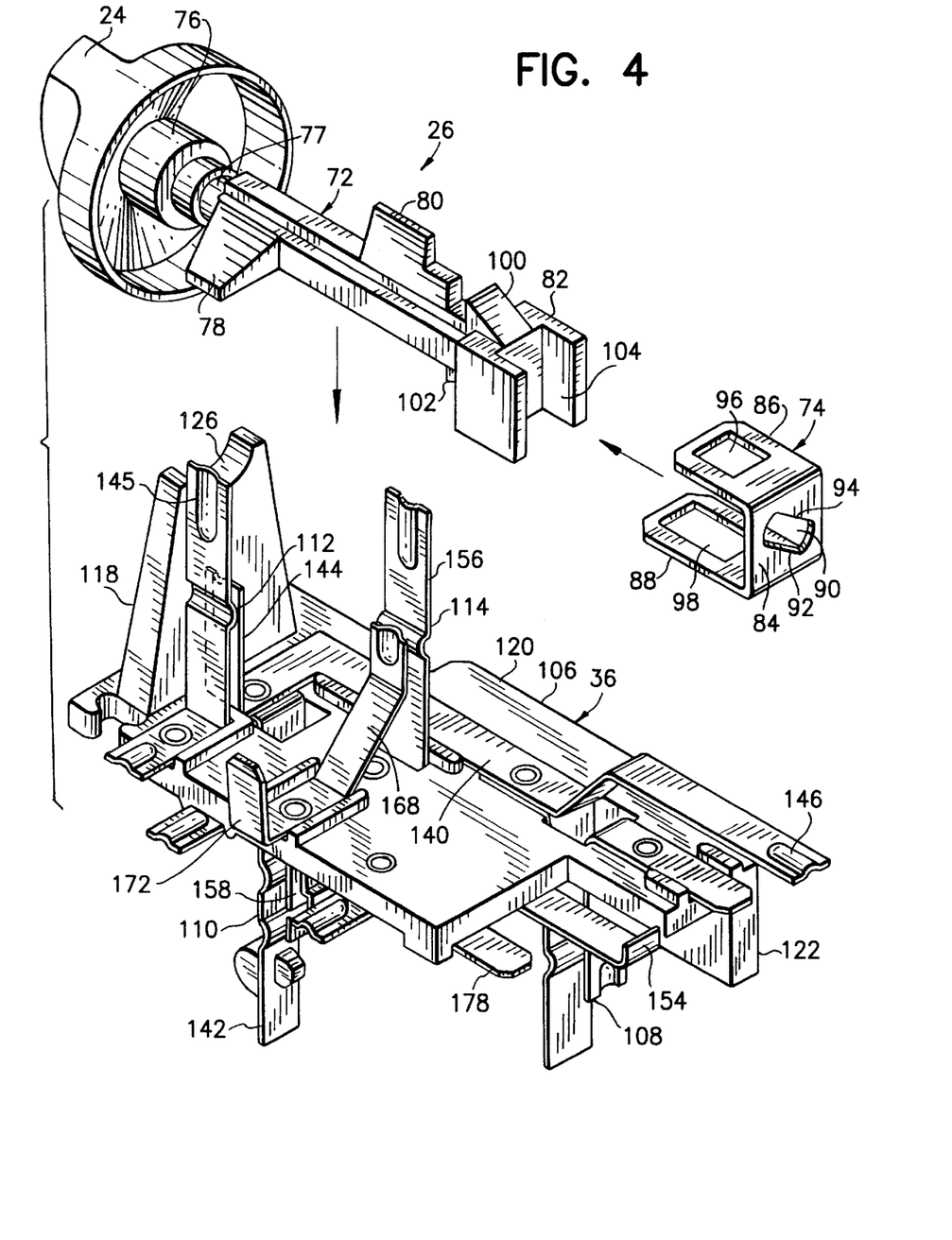
FIG. 4 is a partial exploded perspective view of the bake/broil control knob, control shaft, and electrical switch assembly shown in FIG. 2.

As seen in FIG. 2, the rear end of the bake/broil control shaft 26 is mounted to the top section 62 of the thermostat shaft 46. Referring also to FIG. 4, the control shaft 26 includes a main shaft 72 and a metal clip 74. The main shaft 72 is preferably made of plastic. A front end 76 of the main shaft 72 has the user actuatable bake/broil control knob 24 mounted thereon. The center section of the shaft 72 has two fins 78, 80. The fins 78,80 are located at different longitudinal positions on the main shaft 72 and extend in offset radial directions. In the embodiment shown, the fins 78, 80 are offset 90° from each other. The rear end 82 of the main shaft 72 forms a mounting section for the metal clip 74. The metal clip 74 has a rear face 84 and two legs 86,88. The rear face 84 has a thermostat shaft aperture 90. The aperture 90 is substantially the same size and shape of the outer profile of the top section 62 of the thermostat shaft 46. The aperture 90 has two flat sides 92, 94. The first flat side 92 is larger than the second flat side 94. The first leg 86 has a hole 96. The second leg 88 is longer than the first leg 86 and has a hole 98 that is larger than the first hole 96. The rear end 82 of the main shaft 72 has two snap-lock latches 100, 102 and a rear end recess 104. The latches 100, 102 have different sizes. The different size holes 96, 98 are provided such that the metal clip 74 will be attached to the different size latches 100, 102 in only one position. This insures proper registry between the orientation of the aperture 90 and the fins 78, 80. The keyed mating shapes of the aperture 90 and the top section 64 of the thermostat shaft 46 insure proper registry between the control shaft 26 and the thermostat shaft 46. The recess 104 provides room for the top section 64 to move into an area behind the front face 84 of the metal clip 74. The metal clip 74 is less likely to break or wear with years of repeated use than mere plastic. The wavy spring disk 68 is located directly between the metal clip 74 and the thermostat surface 70. The disk 68 is able to prevent the metal clip 74 from binding against the surface 70 of the thermostat as the thermostat shaft 46 longitudinally moves. In alternate embodiments, other types of central shafts and connections to the thermostat could be provided.

Figure 5A:
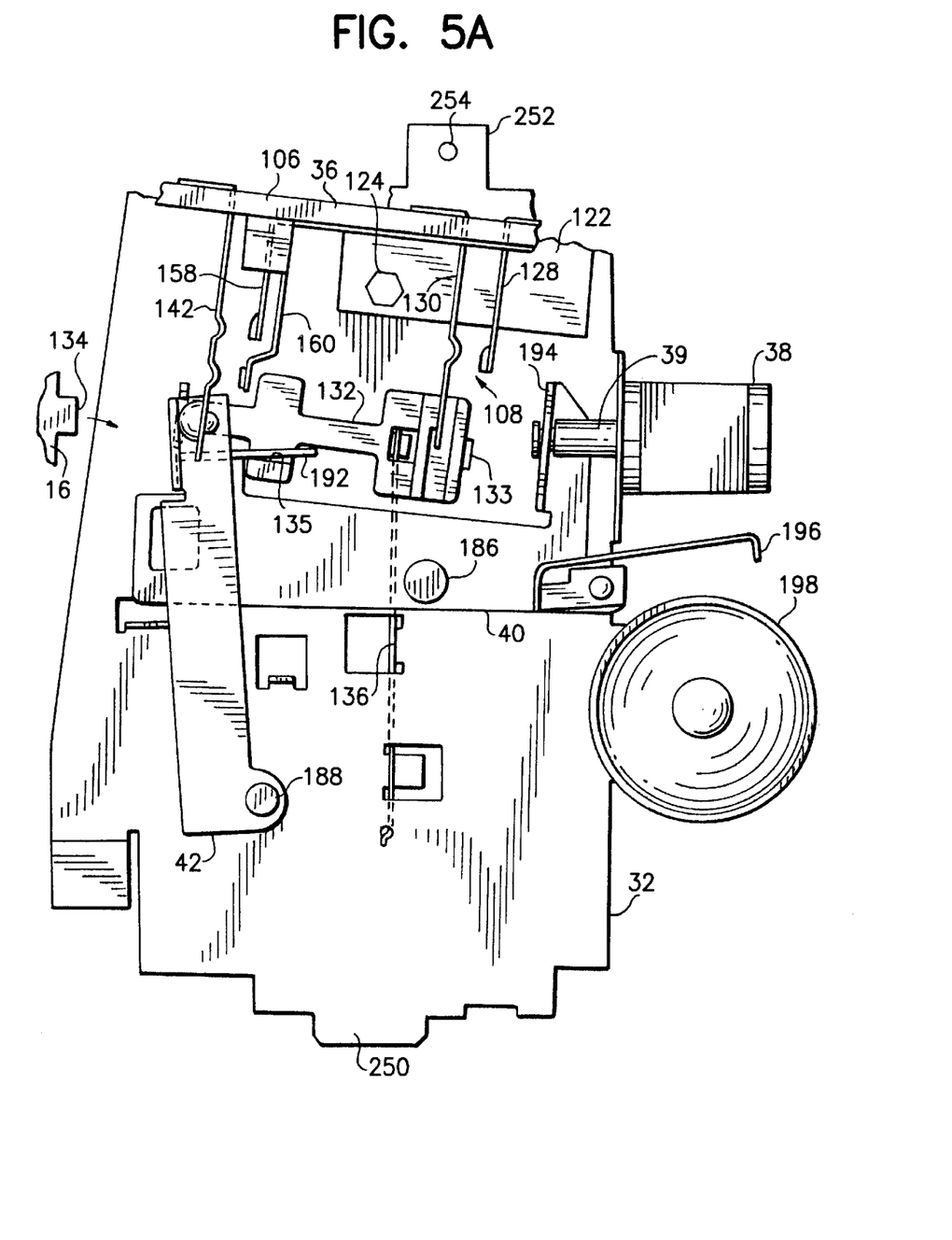
FIG. 5A is a partial side elevational view of the toaster oven modular control assembly shown in FIG. 2 when the oven door is in an open position.
Figure 9:
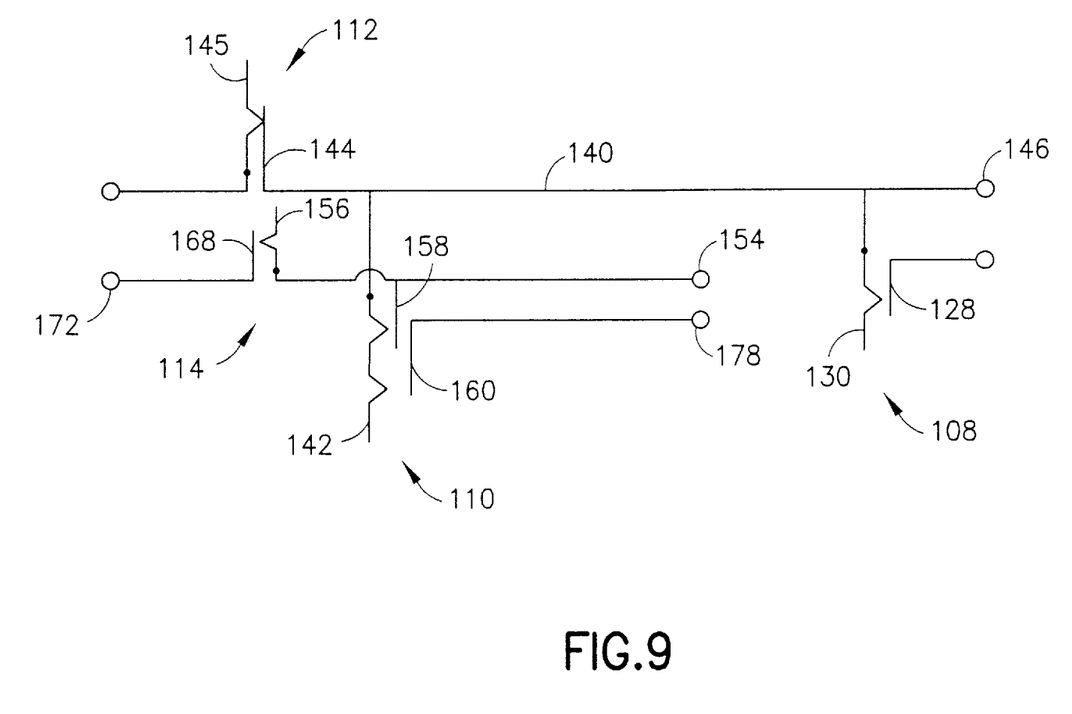
FIG. 9 is a schematic diagram of the contact blades of the electrical switch assembly shown in FIG. 4.

The electrical switch assembly 36 generally comprises a frame 106, four sets of electrical switch contact blades 108, 110, 112, 114, and a light bulb 116 (see FIG. 2). The frame 106 is preferably made of dielectric plastic or polymer material. The frame 106 has a front support 118 on a top side, a side mounting flange 120, and a bottom mounting flange 122. The side flange 120 extends through a mating hole in the frame 32. A fastener 124 (see FIG. 5A) fixedly mounts the bottom flange 122 to the frame 32. The front support 118 has a recess 126 that supports the front of the control shaft 72 at the groove 77. Referring also to FIGS. 5A, and 9 the first set of contact blades 108 are configured to function as a door activated main power switch. The rear blade 128 is connected to the power supply cord. The front blade 130 is attached to a door actuated slide or actuator 132. The slide 132 is slidably mounted in a longitudinal hole 133 in the frame 32. A front portion 138 (see FIG. 5B) of the slide 132 is located on the opposite side of the frame 32 shown in FIG. 5A. The door 16 has a side tab 134 which, when the door is closed, contacts the front portion 138 of the slide 132 and moves the slide 132 into a rearward position. The slide 132 is shown in a forward door open position in FIG. 5A. A spring 136 mounted to the frame 32 biases the slide 132 towards its forward position when the door 16 is open.

Figure 5B:
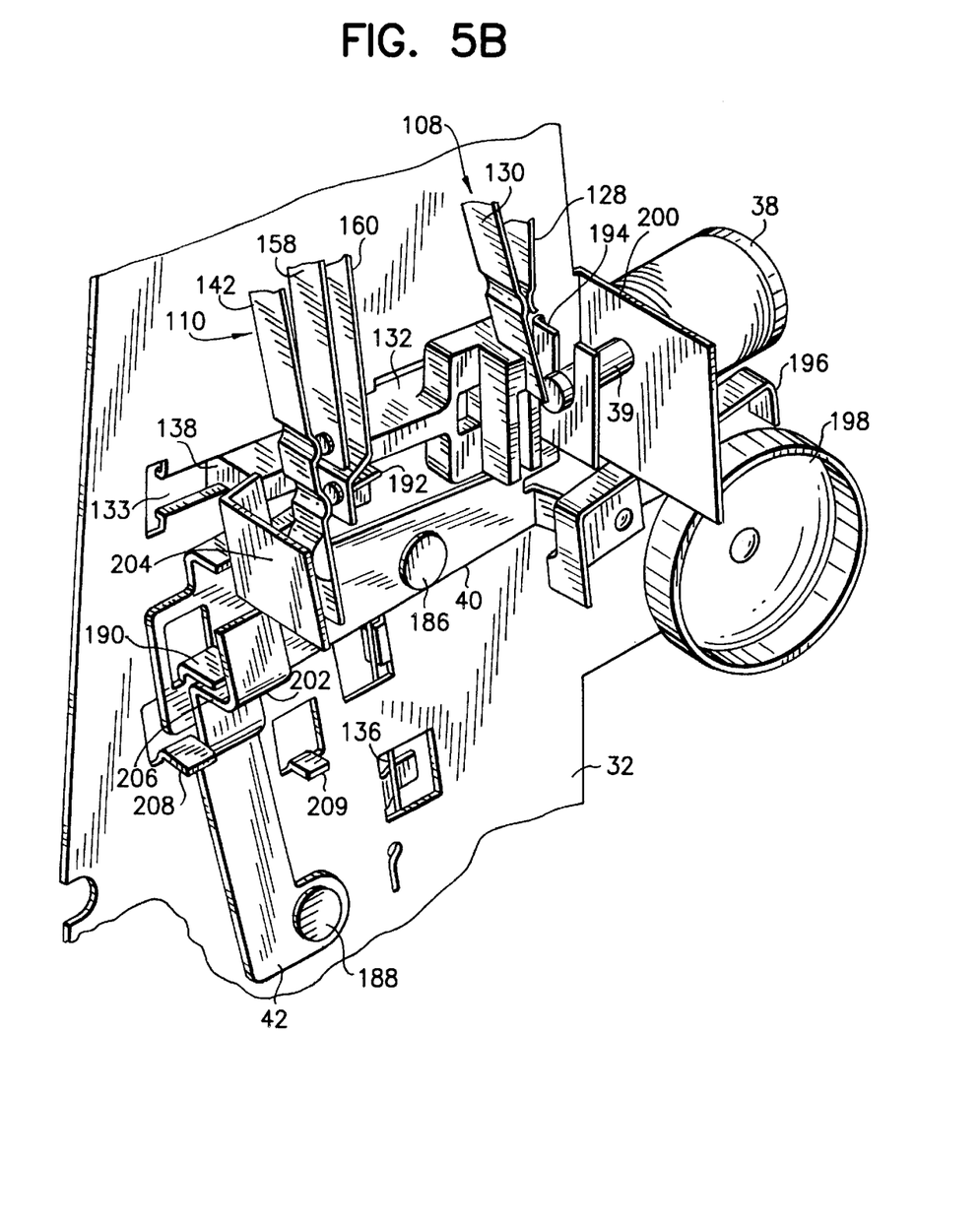
FIG. 5B is a partial perspective view of the control assembly shown in FIG. 5A when the oven door is in a closed position.
Figure 8:
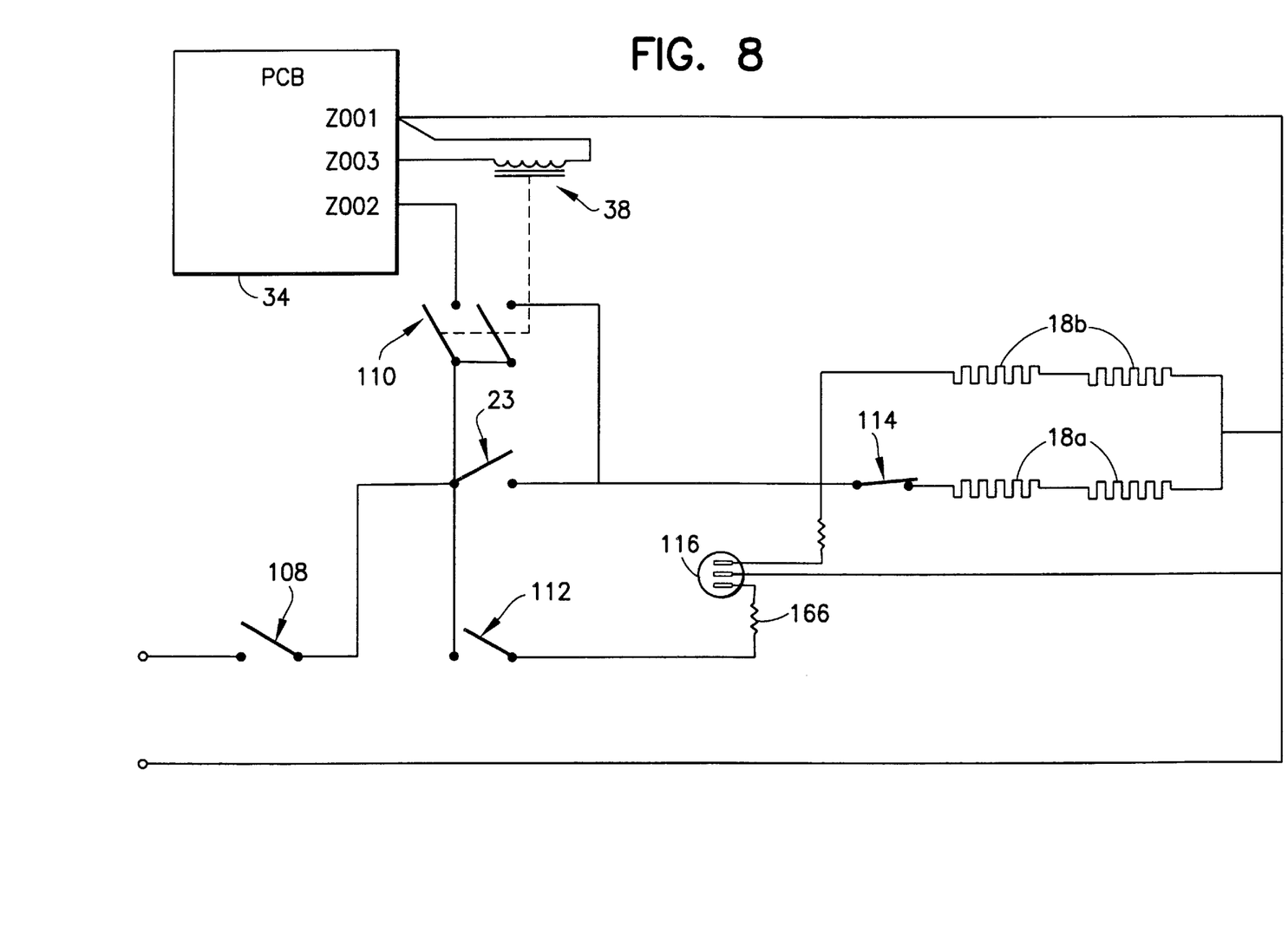
FIG. 8 is circuit diagram of the electrical system used in the toaster oven shown in FIG. 1.

Referring also to FIG. 5B, the slide 132 is shown in its rearward position on the frame 32 when the door is closed; the tab 134 pushing the slide 132 rearward. The slide 132 moves the front blade 130 of the first set of blades into contact with the rear blade 128. This causes electricity to be supplied by the bus bar 140 (see FIG. 4). The bus bar 140 is electrically connected to the first contact blade 142 of the second set of contact blades 110. The bus bar 140 also forms the first contact blade 144 of the third set of contact blades 112 and, forms a terminal 146 that is directly electrically connected to a terminal 148 (see FIG. 2) of the thermostat 23. The second terminal 150 of the thermostat 23 is connected to a bus bar 152. The bus bar 152 is connected to one of the top heater elements 18 and to terminal 154 of the switch assembly 36. The terminal 154 is electrically connected to the first blade 156 of the fourth set of contact blades 114 and to the second blade 158 of the second set of contact blades 110. The third blade 160 of the second set of blades 110 is electrically connected to printed circuit board terminal Z002 by a wire 162 (see FIG. 2). The second blade 145 of the third set of blades 112 is electrically connected to the light bulb 116 by a resistor 166 (see FIG. 8). Referring to FIGS. 2, 4, and 9 the second blade 168 of the fourth set of blades 114 is electrically connected by a wire 170 to the bottom heating elements 18 from the terminal 172. A bus bar 174 connects the top and bottom heating elements 18 by a wire 176 to the terminal 178 and, the terminal 178 is connected by another wire 180 to terminal Z001 on the printed circuit board 34. Another wire 182 connects the terminal Z001 to a terminal on the solenoid 38, and a wire 184 connects the terminal Z003 to a second terminal of the solenoid. The way in which the electrical system functions will be described in more detail below.

Referring to FIG. 5A, the two levers 40, 42 are directly pivotably attached to the frame 32 by pivot fasteners 186, 188, respectively. The two levers are both made of flat sheet metal that has been cut and deformed into the shapes shown. Referring also to FIG. 5B, lever 40 has a front end with a laterally extending latch 190 and a top with an angled rider section 192. The angled rider section 192 is located on top of a ramp section 135 of the slider 132. The rear end of the first lever 40 has a pull surface 194 with a slot therein. The frame 32 of the control assembly 22 has a laterally extending mount section 200 at its rear. The solenoid 38 is attached to the frame 32 at the mount section 200. The plunger 39 of the solenoid is located in the slot of the pull surface 194. The plunger 39 has a groove such that the plunger and pull surface are interlocked. When the plunger 39 is pulled back by the solenoid 38, the plunger moves the rear end of the first lever 40 downward.

The plunger 39 normally pushes against the pull surface 194; a spring (not shown) inside the solenoid biasis the plunger 39 towards an extended position. This normally biases the front end of the first lever 40 towards a downward direction. A bell striker 196 is attached to the rear end of the first lever 40. A bell 198 is attached to frame 32. When the rear end of the first lever is pivoted downward by the solenoid 38, the striker 196 can strike the bell 198 to signal the user of the end of a toast cycle. In the embodiment shown, the striker 196 only strikes the bell 198 when the printed circuit board actuates the solenoid 38. The striker 196 does not strike the bell 198 when the toast cycle is ended other than by the printed circuit board causing the solenoid to move. The second lever 42 has a top end with a lateral step 202 and a lateral push surface 204. The lateral step 202 forms a front latch surface 206. Two lateral tabs 208, 209 on the frame 32 function as limits to the movement of the second lever 42. Although the front of the first lever 40 is normally biased towards a downward direction, the lateral step 202 of the second lever 42 acts as a stop with the latch 190.

Figure 6:
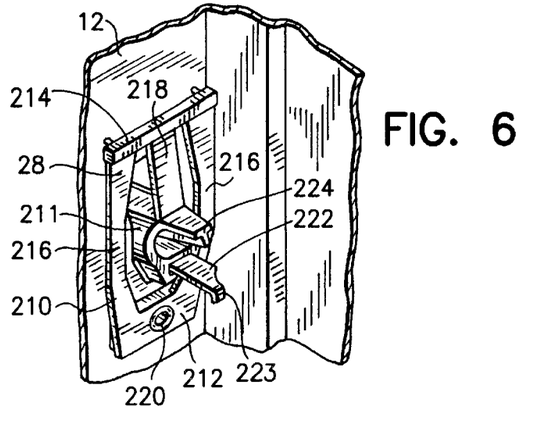
FIG. 6 is a perspective view of the rear of the user actuated toast button and its mounting to the frame of the toaster oven.

Referring also to FIG. 6, the toast push button 28 is shown attached to the frame 12. The button 28 is a one-piece plastic or polymer member. The button 28 has a button section 211 that extends through a hole in the frame 12 to the front face of the toaster oven such that a user can contact and push the button. The rear section 210 of the button has a bottom end 212, a top end 214, two side sections 216, and a center section 218. The bottom end 212 is attached to the frame 12 by a fastener 220. The frame 12 has a guide rail 222 with an end stop tab 223. The rear end of the button section 211 is slidingly mounted on the rail 222. The rear end of the button section 211 also has an end extension 224 for contacting the push surface 204 of the second lever 42. When a user pushes in on the front of the button section 211, the button section 211 slides straight along the rail 222. The button section 211 is connected to the top end 214 by the center section 218. The top end 214 is not directly connected to the frame 12. Therefore, the top end 214 is movable relative to the frame 12. The top end 214 is connected by the side sections 216 to the bottom end 212. Only the bottom end 212 of the rear section 210 is directly fixedly attached to the frame. Thus, when the user moves the button section 211 rearward, the top end 214 moves away from the front wall of the frame 12 with the side sections 216 and center section 218 deflecting. Because the button 28 is made of resilient material, when the user releases the button, the button returns to its forward position shown in FIG. 6.

Figure 5C:
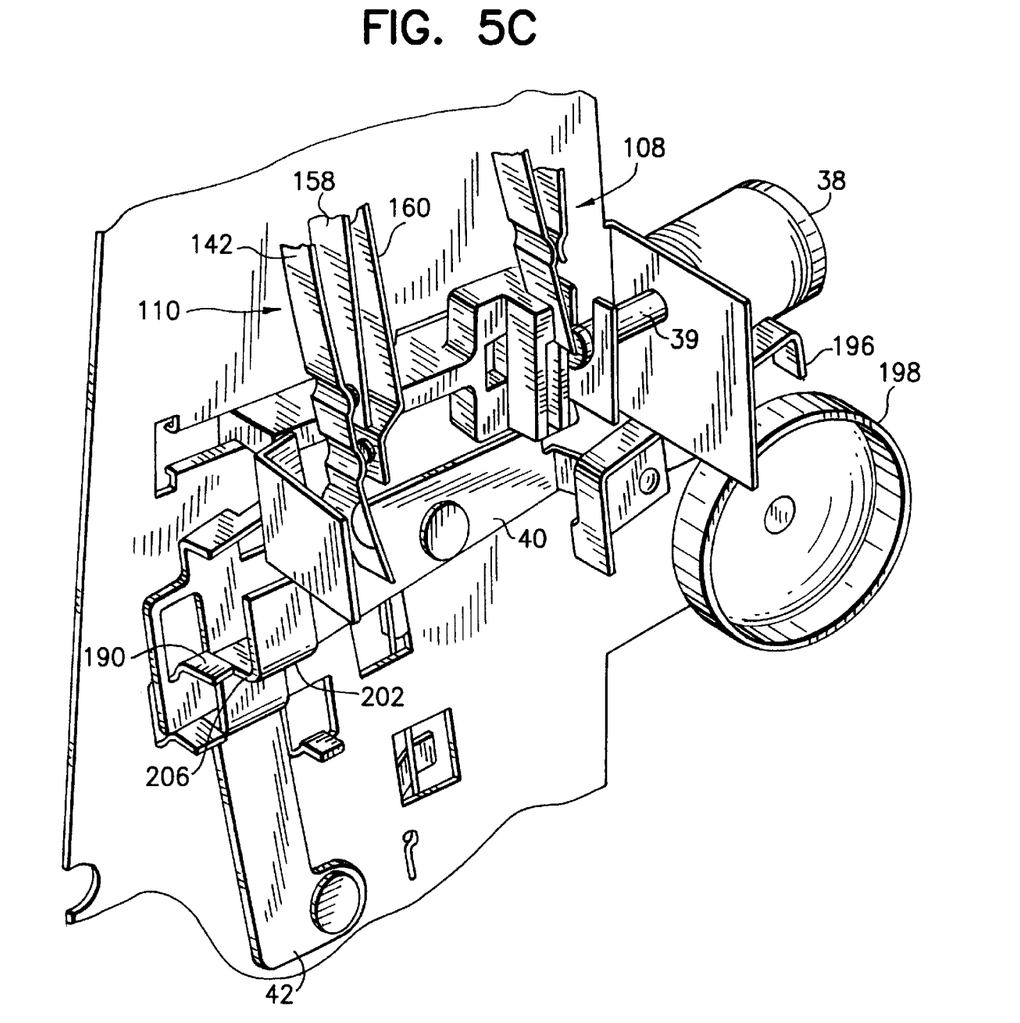
FIG. 5C is a partial perspective view of the control assembly shown in FIG. 5B when the oven door is in a closed position and the user actuated toast button has been depressed.

Operation of the toaster during a toast cycle will now be described. With the door 16 open as shown in FIG. 5A, the main power switch 108 is open. When the user closes the door 16, the tab 134 contacts the front portion 138 of the slider 132 and moves the slider rearward as seen in FIG. 5B. As the slider 132 moves rearward, it moves the blade 130 into contact with the blade 128. This closes the switch 108. Preferably, the door 16 is provided with a spring (not shown) to bias the door towards a closed position and counteract the bias of the spring 136. The door is also preferably provided with a second spring (not shown) to keep the door in a fully open position. As seen from the circuit diagram in FIG. 8, closing the main power switch does not do anything yet because the other switches 23, 110, 112 are still open. The user can then push the toast button 28 to start the toast cycle. When the user presses the toast button 28, the extension 224 (see FIG. 6) on the rear end of the button section 211 contacts the push surface 204 of the second lever 42 to pivot the top of the second lever 42 rearward. As shown in FIG. 5C, when the top of the second lever 42 moves back far enough, the step 202 is moved out from under the front latch 190 of the first lever 40. Because of the bias provided by the solenoid plunger 39 on the first lever 40, the front of the first lever 40 moves down. This causes the latch 190 to latch against the latch surface 206 of the second lever 42. This latching engagement holds the second lever 42 in its rearward position such that the user can release the button 28. As the top of the second lever 42 is moved rearward, the rear face of the push surface 204 moves the first blade 142 of the second switch 110 rearward. During the first blade's deflection, it first contacts the third blade 160. This closes a first circuit to supply electricity to the printed circuit board 34. Subsequently, the first blade 142 then contacts the second blade 158 which supplies electricity to the top and bottom heating elements 18a, 18b. The fourth switch 114 to the bottom heating elements 18b is normally closed except in a broil setting. When the printed circuit board 34 determines that the toast cycle should be stopped, it energizes the solenoid 38. The solenoid 38 pulls its plunger 39 back. The plunger 39 pulls the rear end of the first lever 40 downward. The front end of the first lever 40 moves upward to disengage the latch 190 from the latch surface 206. The first blade 142 biases the second lever back to its forward position and disengages from the second and third contact blades 158, 160. As the rear end of the first lever 40 is moved downward by the solenoid 38, its striker 196 strikes the bell 198 to signal the user that the toast cycle is complete. The user can set the desired toast level (light to dark) at the rotatable toast knob 30 (see FIGS. 1 and 2). In addition to the printed circuit board 34 automatically turning the toast cycle OFF, the toaster oven 10 also has an open door system that turns OFF the toast cycle if the door 16 is opened by the user during a toast cycle. More specifically, referring to FIGS. 5A and 5B, when the user opens the door 16, the tab 134 is moved away from the front portion 138 of the slider 132. The spring 136 then moves the slider 132 to its forward position. This causes the two blades 128, 130 of the main power switch 108 to move apart thereby stopping the supply of electricity to the heating elements 18. In addition, as the slider 132 moves forward, the ramp section 135 of the slider 132 moves forward to wedge against the angled rider section 192 of the first lever 40. This causes the front end of the first lever 40 to move upward resulting in disengagement of the latch 190 from the latch surface 206. The first blade 142 of the second switch 110 is then able to deflect forward, moving the top of the second lever 42 forward, and disengaging from the second and third blades 158, 160. Hence, there are two ways to turn the toast cycle OFF; automatic and door open actuated.

Figures 7A, 7B, 7C:
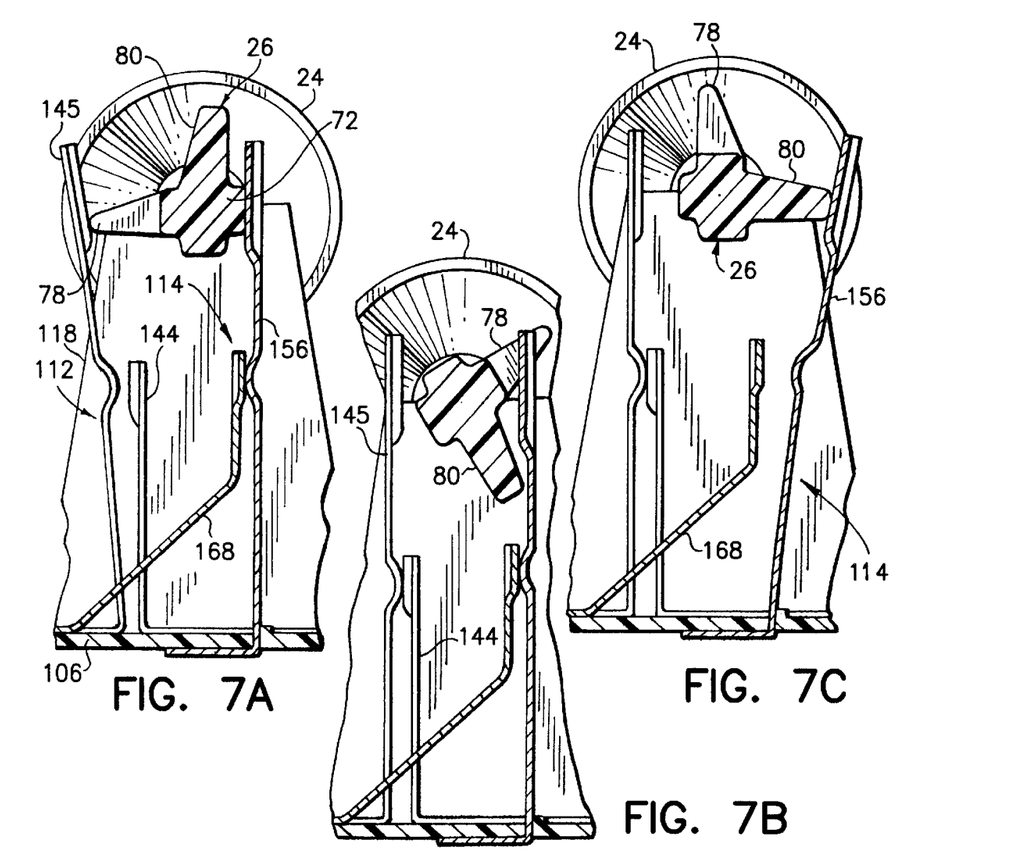
FIG. 7A is a partial cross-sectional view of the control shaft and electrical switch assembly shown in FIG. 4 taken along line 7A—7A of FIG. 2 when the bake/broil control knob is set at an OFF position.
FIG. 7B is a partial cross-sectional view as in FIG. 7A when the bake/broil control knob is set at a bake position.
FIG. 7C is a partial cross-sectional view as in FIG. 7A when the bake/broil control knob is set at a broil position.

The bake and broil operations of the toaster oven will now be described. Referring to FIGS. 2 and 7A, the control shaft 26 is shown at an OFF position. In this OFF position the third set of contact blades 112 are separated from each other. More specifically, the front fin 78 of the main shaft 72 deflects the second blade 145 away from the first blade 144. The third set of blades 112 form a switch for the light bulb 116. The fourth set of blades 114 contact each other in this OFF position. The thermostat 23 is set at an OFF position (with cam pin 52 on raised surface 56) when the control shaft 26 is at this OFF position. When the user rotates the knob 24 from the OFF position shown in FIG. 7A to the bake position shown in FIG. 7B, the front fin 78 is moved off of the second blade 145. The second blade 145 is thus able to deflect back against the first blade 144. This causes the light bulb 116 to light. This indicates to the user that baking or broiling is occurring. The rotational position of the control shaft 26 sets the thermostat 23 at the desired temperature setting. FIG. 7C shows the control shaft 26 at a broil position at the end of the rotation movement of the shaft. In this broil position the second fin 80 has contacted and moved the first blade 156 of the fourth set of contact blades 114 away from the second blade 168. The fourth set of blades 114 function as a switch for the bottom heating elements 18a (see FIG. 8). Thus, when the switch 114 is open, electricity is not supplied to the bottom heating elements 18a, but is supplied to the top heating elements 18b. In addition, the control shaft 26 moves the thermostat shaft 46 such that the cam pin 52 is located at the second raised section 60 (see FIG. 3B). Thus, in this broil position, the thermostat is set at a predetermined temperature and only the top heating elements are active. Similar to the toast cycle, if the door 16 is opened, the slider 132 will open the main power switch 108 to interrupt power supply during the bake or broil operations.

The present invention has many different features. The thermostat is new because, in addition to an OFF position and variable temperature settings, the thermostat also includes a predetermined temperature position which, in the embodiment described above, is provided to allow a broil temperature setting at the end of the rotational stroke of the thermostat shaft. The thermostat shaft also has a new top section which, because of the two flat sides, has been found to have reduced play between the control shaft 26 and the thermostat shaft 46. This provides more accurate bake temperature settings of the knob 24 relative to the thermostat shaft 46. The top end of the thermostat shaft can be relatively easily machined to provide its two flat sides to mate with the aperture 90 in the metal clip. The use of the metal clip on the rear end of the control shaft 26 stands up very well to wear. The aperture 90 can also be stamped into the metal clip with good precision. The electrical switch assembly 36 can be separately assembled and attached to the frame 32 with only a single fastener 124. All the components of the modular control assembly 22 can be attached to the single frame 32 and then attached to the frame 12 of the toaster oven in a single step. More specifically, as seen in FIG. 5A, the frame 32 has a bottom tab 250 and a top tab 252. The bottom tab 250 fits in a mating hole in the frame 12 of the toaster oven. The top tab 252 has a hole 254. A single fastener is used in the hole 254 to attach the top tab 252 to the frame 12. Thus, only a single fastener is used to attach the control assembly 22 to the frame 12. The toast button 28 and its mounting to the frame 12 by use of a single fastener is new and provides an accurate and resilient button section movement. The interaction between the door tab 134 and the door controlled switch actuator 132 provides a very quick response to the door being opened. The door 16 only needs to be opened about 5° before the actuator 132 opens the main power switch 108. Thus, the heating elements 18 are not being supplied with electricity when the door 16 is open. The control assembly 22 only uses two levers 40, 42. The same control shaft 26 is used to operate the light bulb switch 112, open the switch 114 to deactivate the bottom heaters during broiling, and move the thermostat shaft 46 to set bake and broil temperatures. One of the unique features of the present invention is the ability to use the control assembly 22 in any suitable type of toaster oven. If the toaster oven 10 is redesigned, the control assembly 22 should be able to be used in the redesigned unit. The control assembly 22 should also be able to be used in different models of toaster ovens. Thus, a single manufacturer can have multiple toaster oven models, but which use the same control assembly 22. This can save manufacturing and part supply costs.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A toaster oven modular control assembly comprising:

a frame;

an electrical switch assembly connected to the frame, the switch assembly having multiple sets of electrical switch contact blades;

a solenoid connected to the frame;

two levers directly pivotably connected to the frame, a first one of the levers being connected to the solenoid to be moved by the solenoid and a second one of the levers being adapted to move one of the sets of contact blades to a closed position, wherein the two levers have portions adapted to engage and lock against each other; and a door-controlled switch actuator directly slidingly mounted to the frame, the actuator being adapted to be directly moved by a portion of a door of a toaster oven to move one of the sets of contact blades to a closed position, the door-controlled switch actuator including a ramp section that has a rider section of the first lever moveably located thereagainst.

2. An assembly as in claim 1 further comprising a printed circuit board connected to the frame.

3. As assembly as in claim 1 wherein one of the sets of contact blades forms a two stage switch with the second lever wherein, during movement of the second lever to an actuated position, a first one of the stages is electrically closed to deliver electricity to a printed circuit board and a second one of the stages is subsequently closed to deliver electricity to heating elements of a toaster oven.

4. An assembly as in claim 1 wherein the electrical switch assembly includes a dielectric frame and four sets of the contact blades mounted on the dielectric frame.

5. As assembly as in claim 4 wherein the dielectric frame has a section for supporting a user actuated rotatable control shaft.

6. An assembly as in claim 1 wherein the frame has a mounting tab section for insertion into a hole of a housing of a toaster oven and a fastener hole such that the frame can be fixedly and stationarily mounted to the housing by a single fastener.

* * * * *